(12) United States Patent
Lu et al.

(10) Patent No.: US 9,004,880 B2
(45) Date of Patent: Apr. 14, 2015

(54) FAN MOTOR SET LOCATING STRUCTURE

(75) Inventors: Yen-Chin Lu, New Taipei (TW);
Chun-Hao Huang, New Taipei (TW);
Chun-Liang Ho, Sinjhuang (TW)

(73) Assignee: Asia Vital Components Co., Ltd., New Taipei (TW)

( * ) Notice: Subject to any disclaimer, the term of this patent is extended or adjusted under 35 U.S.C. 154(b) by 724 days.

(21) Appl. No.: 13/253,734

(22) Filed: Oct. 5, 2011

(65) Prior Publication Data

US 2013/0089442 A1    Apr. 11, 2013

(51) Int. Cl.
*F04D 25/06*    (2006.01)
*H02K 5/167*    (2006.01)
*H02K 5/04*    (2006.01)
*H02K 7/14*    (2006.01)

(52) U.S. Cl.
CPC .......... *H02K 5/1675* (2013.01); *F04D 25/0646* (2013.01); *H02K 5/04* (2013.01); *H02K 7/14* (2013.01)

(58) Field of Classification Search
CPC  F04D 25/0613;  F04D 25/0646;  F04D 25/062

USPC .................... 417/354, 423.1, 423.12, 423.14, 417/352–353
See application file for complete search history.

(56) References Cited

U.S. PATENT DOCUMENTS

2006/0012261 A1* 1/2006 Ku et al. ........................ 310/215
2007/0241643 A1* 10/2007 Watanabe et al. ........... 310/67 R

* cited by examiner

*Primary Examiner* — Charles Freay
*Assistant Examiner* — Philip Stimpert

(57) ABSTRACT

A fan motor set locating structure includes a base seat and a motor set. The base seat has a bearing cup. At least one locating notch is formed on a top section of the bearing cup. A bearing is disposed in the bearing cup. The motor set includes an insulation support. One side of the insulation support is formed with a sleeve. The sleeve is capped on the bearing cup. The sleeve has at least one protrusion section protruding from the sleeve to the bearing cup corresponding to the locating notch. The protrusion section is engaged in the locating notch in abutment with the bearing. Accordingly, the motor set can be quickly fixedly assembled with the bearing cup to fix the bearing. Therefore, the number of the components is decreased and the assembling process is speeded.

5 Claims, 5 Drawing Sheets

FAN MOTOR SET LOCATING STRUCTURE

BACKGROUND OF THE INVENTION

1. Field of the Invention

The present invention relates generally to a fan motor set locating structure, which is able to quickly fix the motor set and the bearing to speed the assembling process. In addition, in the fan motor set locating structure, the number of components is decreased.

2. Description of the Related Art

Recently, all kinds of electronic information products (such as computers) have been more and more popularly used and widely applied to various fields. There is a trend to increase processing speed and expand access capacity of the electronic information products. Therefore, the electronic components of the electronic information products have operated at higher and higher speed. When operating at high speed, the electronic components generate high heat at the same time.

With a computer host taken as an example, the central processing unit (CPU) in the computer host generates most of the heat generated by the computer host in operation. In case the heat is not efficiently dissipated, the temperature of the CPU will rise very quickly to cause deterioration of the execution efficiency. When the accumulated heat exceeds a tolerable limit, the computer will crash or even burn down in some more serious cases. Moreover, for solving the problem of electromagnetic radiation, the computer host is often enclosed in a computer case. This will affect the dissipation of the heat generated by the computer host. Therefore, it has become a critical issue how to quickly conduct out and dissipate the heat generated by the CPU and other heat-generating components.

Conventionally, a heat sink and a cooling fan are arranged on the CPU to quickly dissipate heat. One side of the heat sink has multiple radiating fins, while the other side of the heat sink is free from any radiating fin. The surface of the other side of the heat sink directly contacts the CPU for conducting heat to the radiating fins. The radiating fins serve to dissipate the heat by way of radiation. In addition, the cooling fan cooperatively forcedly drives airflow to quickly carry away the heat.

FIG. 1 shows a conventional cooling fan. The cooling fan includes a base seat 1. A hollow bearing cup 11 protrudes from the base seat 1. A bearing 12 is disposed in the bearing cup 11 and retained therein by means of a retainer plate 13. A motor set 14 is arranged around the bearing cup 11. The motor set 14 has a winding 141 connected to a circuit board via a lead. When mounting the motor set 14 around the bearing cup 11, the bearing cup 11 is fitted in the motor set 14 without being securely located. In this case, the motor set 14 is likely to rotate around the bearing cup 11. As a result, when conducting the lead outside to the circuit board, the lead may be mis-conducted or abraded. Therefore, it costs longer time to assemble and locate the motor set. Moreover, it is necessary to additionally retain the bearing with the retainer plate 13. According to the above, the conventional cooling fan has the following shortcomings:

1. The motor set is not securely located on the bearing cup so that the motor set is likely to displace.
2. It is necessary to additionally retain the bearing with the retainer plate.
3. The assembling process is complicated.

SUMMARY OF THE INVENTION

A primary object of the present invention is to provide a fan motor set locating structure, which is able to quickly fix the motor set and the bearing.

A further object of the present invention is to provide the above fan motor set locating structure, in which the number of components is decreased to speed the assembling process.

To achieve the above and other objects, the fan motor set locating structure of the present invention includes a base seat and a motor set. The base seat has a bearing cup protruding from the base seat. The bearing cup is formed with an internal bearing hole in which a bearing is disposed. At least one locating notch is formed on a top section of the bearing cup. The motor set includes an insulation support. One side of the insulation support is formed with a sleeve capped on the bearing cup. At least one protrusion section protrudes from the sleeve to the bearing cup. The protrusion section is engaged in the locating notch in abutment with the bearing. The protrusion section is correspondingly engaged in the locating notch to quickly fixedly assemble the motor set on the bearing cup and retain the bearing in the bearing cup. Therefore, the number of components is decreased and the assembling process is speeded.

According to the above, the present invention has the following advantages:

1. The motor set can be effectively secured to the bearing cup in a true position.
2. The bearing can be retained at the same time.
3. The number of components is decreased and the assembling process is speeded.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
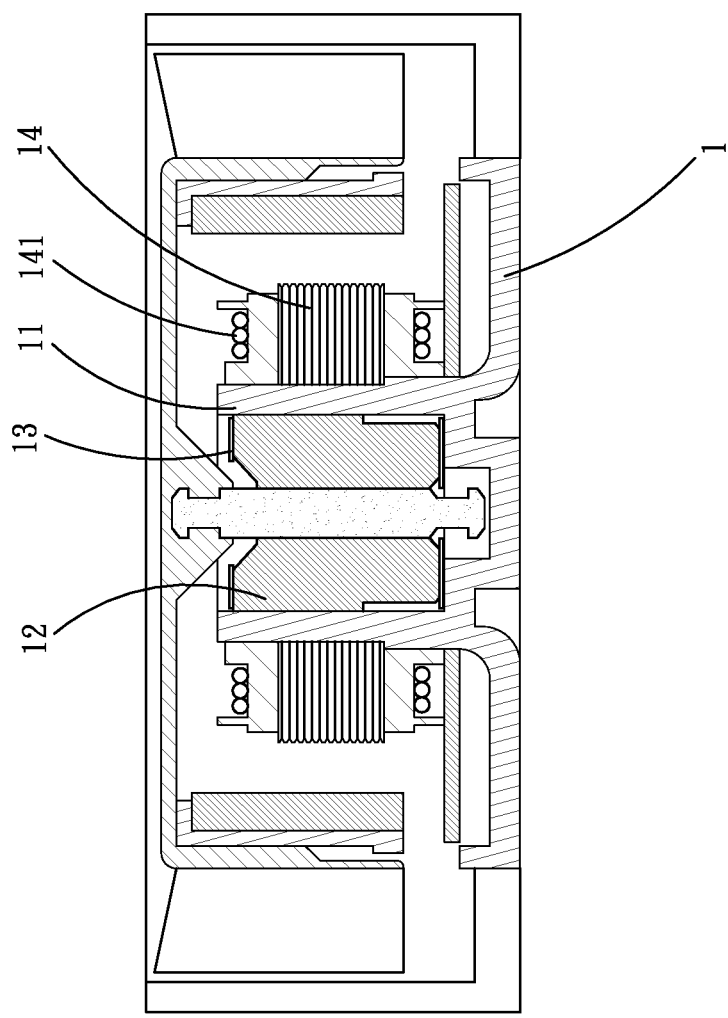
FIG. 1 is a sectional assembled view of a conventional cooling fan.
Figure 2:
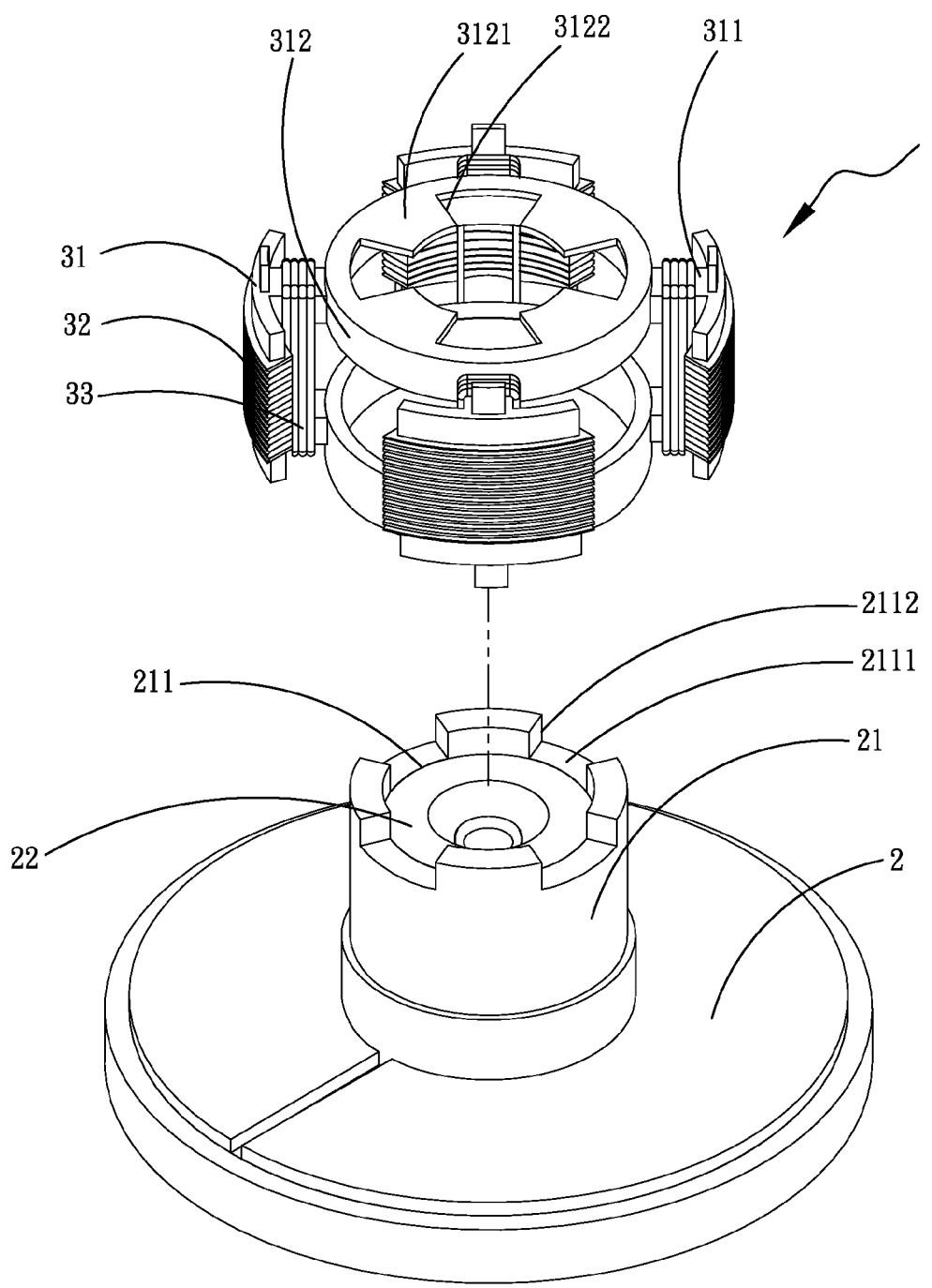
FIG. 2 is a perspective exploded view of a first embodiment of the present invention.
Figure 3:
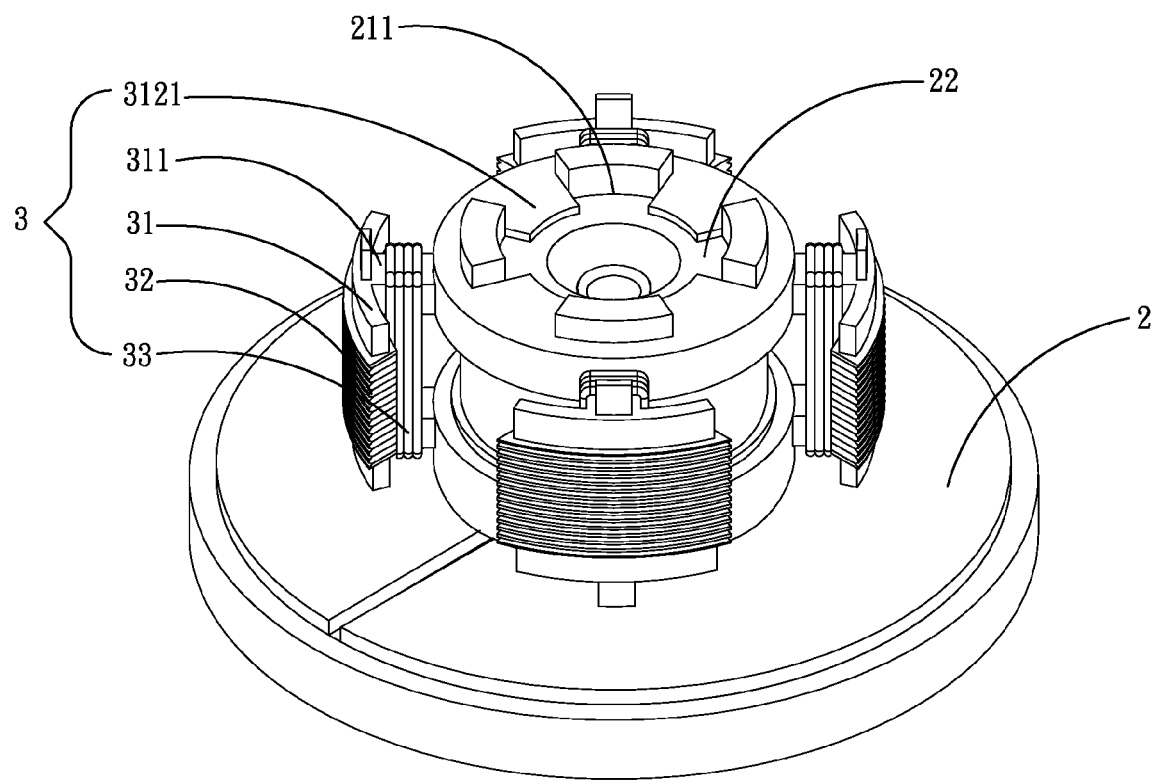
FIG. 3 is a perspective assembled view of the first embodiment of the present invention.

Please refer to FIGS. 2 and 3. FIG. 2 is a perspective exploded view of a first embodiment of the present invention. FIG. 3 is a perspective assembled view of the first embodiment of the present invention. According to the first embodiment, the fan motor set locating structure of the present invention includes a base seat 2 and a motor set 3.

The base seat 2 has a bearing cup 21 protruding from the base seat 2. The bearing cup 21 is formed with an internal bearing hole 211. At least one locating notch 2111 is formed on a top section of the bearing cup 21. A bearing 22 is disposed in the bearing hole 211. The bearing 22 is selected from a group consisting of ball bearing, roller bearing, needle bearing, ceramic bearing and oil-retaining bearing. In this embodiment, the bearing is, but not limited to, a roller bearing.

The motor set 3 includes an insulation support 31 and multiple silicon steel sheets 32. The insulation support 31 is disposed on the top of the silicon steel sheets 32. Multiple insulation posts 311 outward extend from the insulation support 31 for assembling with the silicon steel sheets 32. Multiple windings 33 are wound on the insulation posts 311 and the silicon steel sheets 32 to form the motor set 3.

The motor set 3 is disposed on the base seat 2 and fitted around the bearing cup 21. The motor set 3 is assembled with the bearing cup 21 via the insulation support 31. The insulation support 31 is assembled on the top section of the bearing cup 21. One side of the insulation support 31 has a sleeve 312, which side faces the bearing cup 21. The sleeve 312 is capped on the bearing cup 21. At least one protrusion section 3121 protrudes from the sleeve 312 to the bearing cup 21 corresponding to the locating notch 2111. When fitting the motor set 3 onto the bearing cup 21, the protrusion section 3121 is fitted into the locating notch 2111. Accordingly, the protrusion section 3121 can be correspondingly engaged in the locating notch 2111 to quickly affix the motor set 3 onto the bearing cup 21 in a true position. In this case, the motor set 3 is prevented from rotating around the bearing cup 21. Moreover, when conducting the lead of the winding 33 of the motor set 3 to the circuit board, the lead is prevented from being conducted to an incorrect position or abraded. In addition, the protrusion section 3121 extends through the locating notch 2111 to a position above the bearing 22 in abutment with the top of the bearing 22. Accordingly, the number of the components is decreased and the assembling process is speeded.

The locating notch 2111 has at least one lateral stop side 2112 formed on the top section of the bearing cup 21. The protrusion section 3121 has an abutment side 3122 corresponding to the stop side 2112. When the insulation support 31 is assembled on the top section of the bearing cup 21 with the protrusion section 3121 fitted in the locating notch 2111, the abutment side 3122 abuts against the stop side 2112 to securely affix the insulation support 31 onto the bearing cup 21. Under such circumstance, the motor set 3 is prevented from swinging around the bearing cup 21.

Figure 4:
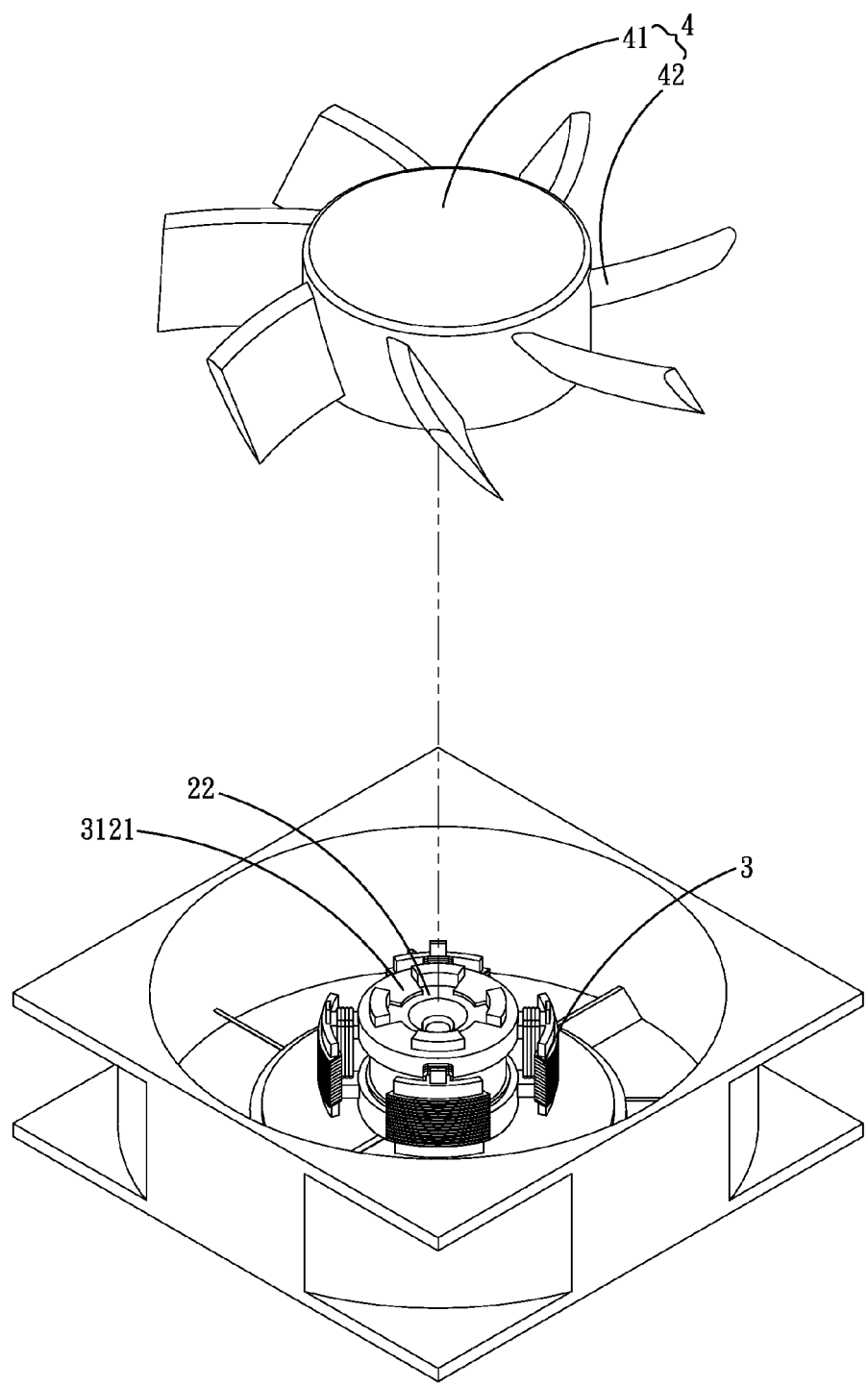
FIG. 4 is a perspective exploded view of a second embodiment of the present invention.
Figure 5:
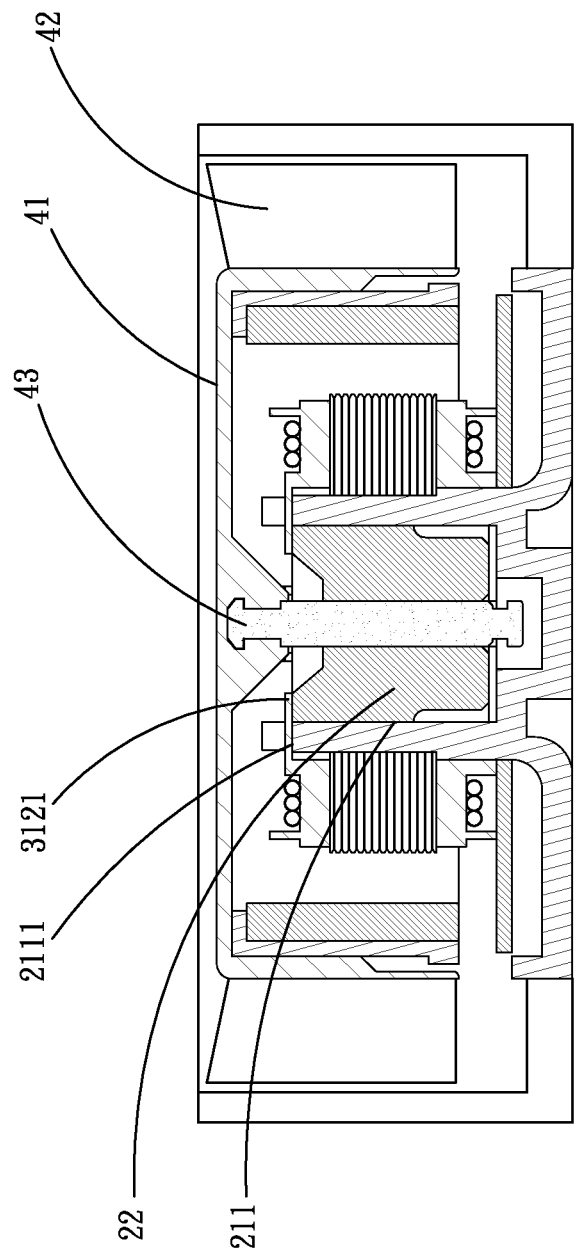
FIG. 5 is a sectional assembled view of the second embodiment of the present invention.

Please now refer to FIGS. 4 and 5. FIG. 4 is a perspective exploded view of a second embodiment of the present invention. FIG. 5 is a sectional assembled view of the second embodiment of the present invention. In this embodiment, a fan impeller 4 is assembled on the base seat 2. The fan impeller 4 has a hub 41, multiple blades 42 and a shaft rod 43. The blades 4 radially extend from an outer circumference of the hub 41 in a direction away from the hub 41. The shaft rod 43 is rotatably fitted in the bearing 22 to form a fan device. As aforesaid, the protrusion section 3121 is correspondingly fitted in the locating notch 2111 in abutment with the top end of the bearing 22 to secure the bearing 22 in the bearing hole 211. Accordingly, in operation of the fan device, the bearing 22 and the motor set 3 are effectively secured. Therefore, the number of steps of the assembling process is decreased and the assembling process is speeded.

The above embodiments are only used to illustrate the present invention, not intended to limit the scope thereof. It is understood that many changes and modifications of the above embodiments can be made without departing from the spirit of the present invention. The scope of the present invention is limited only by the appended claims.

What is claimed is:

1. A fan motor set locating structure comprising:
a base seat having a bearing cup protruding from the base seat, the bearing cup being formed with an internal bearing hole in which a bearing is disposed, at least one locating notch being formed on a top section of the bearing cup and having at least one lateral stop side; and
a motor set including an insulation support, the insulation support having a sleeve capped on the bearing cup, at least one protrusion section radially inwardly protruding from the sleeve to the bearing cup and having an abutment side corresponding to the stop side, each protrusion section being fitted in a corresponding locating notch in abutment with the bearing; and
wherein each protrusion section is engaged in a corresponding locating notch and wherein each protrusion section is recessed in the corresponding locating notch.

2. The fan motor set locating structure as claimed in claim 1, wherein the insulation support has multiple insulation posts for assembling with multiple silicon steel sheets, multiple windings being wound on the insulation posts and the silicon steel sheets to form the motor set.

3. The fan motor set locating structure as claimed in claim 1, wherein a fan impeller is assembled on the base seat, the fan impeller including a hub, multiple blades and a shaft rod, the blades radially extending from an outer circumference of the hub in a direction away from the hub, the shaft rod being rotatably fitted in the bearing to form a fan device.

4. The fan motor set locating structure as claimed in claim 2, wherein the motor set is fitted around the bearing cup.

5. The fan motor set locating structure as claimed in claim 1, wherein the protrusion section abuts against a top section of the bearing.

* * * * *